United States Patent
Dong

(10) Patent No.: US 7,016,360 B1
(45) Date of Patent: Mar. 21, 2006

(54) GATEWAY FOR PROCESSING WIRELESS DATA CONTENT

(75) Inventor: Zhi-Feng Dong, Mountain View, CA (US)

(73) Assignee: Wiregate Technology, Inc., Mountain View, CA (US)

( * ) Notice: Subject to any disclaimer, the term of this patent is extended or adjusted under 35 U.S.C. 154(b) by 943 days.

(21) Appl. No.: 09/975,092

(22) Filed: Oct. 10, 2001

Related U.S. Application Data

(60) Provisional application No. 60/239,433, filed on Oct. 10, 2000, provisional application No. 60/239,307, filed on Oct. 10, 2000, provisional application No. 60/239,503, filed on Oct. 10, 2000.

(51) Int. Cl.
*H04L 12/66* (2006.01)

(52) U.S. Cl. ...................... 370/401; 370/466
(58) Field of Classification Search ................ 370/465, 370/466, 467, 401
See application file for complete search history.

(56) References Cited

U.S. PATENT DOCUMENTS

2003/0145106 A1 * 7/2003 Brown ....................... 709/238
2005/0058161 A1 * 3/2005 Sorokopud et al. ......... 370/912
2005/0111445 A1 * 5/2005 Wybenga et al. ........... 370/389

* cited by examiner

*Primary Examiner*—Melvin Marcelo

(74) *Attorney, Agent, or Firm*—Pillsbury Winthrop et al.

(57) ABSTRACT

A wireless gateway architecture integrates support for a plurality of wireless standards and protocols. In accordance with the architecture of the invention, a wireless gateway includes a chassis with an interconnecting backplane for allowing the addition and removal of different modules as they are needed. Each system module (e.g. WAP accelerator, SMS module, Page module, Mobile IP module, TSL/WTSL Accelerator, Multimedia Accelerator) is a fully working product that supports one particular function. A common bearer module supports all wired network interfaces such as Ethernet, ATM, Frame Relay, ISDN and more, as well as all wireless protocols including GSM, GPRS, SMS, Paging and more. A common database stores user and system information. A central manager manages all system modules, communications among them, and regular health check-ups. A wireless gateway preferably further includes a dedicated WAP engine that offloads the WML encoding and decoding functions from the CPU.

12 Claims, 7 Drawing Sheets

GATEWAY FOR PROCESSING WIRELESS DATA CONTENT

CROSS-REFERENCE TO RELATED APPLICATIONS

The present application is based on, and claims priority from, U.S. Provisional Appln. No. 60/239,433, U.S. Provisional Appln. No. 60/239,307 and U.S. Provisional Appln. No. 60/239,503, all filed Oct. 10, 2000, commonly owned by the assignee of the present application, the contents of which are incorporated herein by reference.

FIELD OF THE INVENTION

This invention relates generally to exchanging data between wired and wireless data communication infrastructures and, more particularly, to a gateway architecture and implementation that integrates support for a plurality of wireless standards and protocols.

BACKGROUND OF THE INVENTION

Recently, there has been an explosion in the number of wireless devices (e.g. cellular and digital PCS phones, pagers, wireless modems, PDAs, etc.) in use. These numbers continue to grow dramatically and are predicted to do so for the foreseeable future. Along with this growth is a demand for bringing Internet applications (e.g. web browsing, e-mail) to the wireless device. However, such applications suffer from slow transmission speeds and the need to build wireless Internet infrastructure piece by piece with each new application.

FIG. 1 illustrates the existing Internet/World Wide Web (WWW) model. As shown in FIG. 1, a client 102 coupled to the Internet communicates with an origin server 104 also coupled to the Internet. A user agent (e.g. browser) 106 in the client sends requests for one or more named data objects (or content) 110 to an origin server by specifying the Uniform Resource Locator (URL) of the data object. The origin server 104 responds with the requested data expressed in one of the formats known to the user agent (e.g. Hypertext Markup Language (HTML)). The URL from the user agent may specify a data object already in a known format such as HTML, or the URL may specify a server application such as a CGI script 108 that generates content in one of the known content formats. The user agent 106 can communicate with the origin server 104 using a known protocol such as Hypertext Transfer Protocol (HTTP).

The wireless Internet model in accordance with the Wireless Application Protocol (WAP) closely follows the WWW model, the wireless model being illustrated in FIG. 2. As shown in FIG. 2, the wireless model further includes a gateway 204 that is responsible for encoding and decoding data transferred from and to the mobile client. One of the purposes of encoding content delivered to the client is to minimize the size of data sent to the client over-the-air as well as to minimize the computational energy required by the client to process that data. Although shown in FIG. 2 as a separate dedicated device, the functionality of the gateway may actually be incorporated within an origin server. The gateway further must perform functions for managing the traffic flowing between the origin server and the mobile client, including session management and protocol conversion.

The client 202 resides in a wireless device so as to provide specific functionality (e.g. display content) to the wireless user. User agents (such as browsers) 306 can be integrated into the client. They interpret network content referenced by a URL. Typically, user agents include functionality for interpreting two primary standard types of content: encoded Wireless Markup Language (WML) and compiled Wireless Markup Language Script (WMLScript).

In operation, user agents can communicate with the gateway 204 using Wireless Session Protocol (WSP). The gateway in turn provides protocol conversion functions to connect to an HTTP origin server. For example, a user, with a WAP-compliant telephone, requests content using a specific URL. The telephone browser (i.e. user agent 206) connects to the operator-controlled gateway with WSP and sends an encoded GET request with that URL. The gateway decodes the request, resolves the host address specified by the URL and creates an HTTP session to that host. The gateway then performs a request for the content specified by the URL. The HTTP server at the contacted host processes the request and sends a reply (e.g., the requested content). The gateway 204 receives the content from the origin server 104 and encodes it using an encoder (i.e. tokeniser) 208 that converts the content from a textual format to a binary format. The gateway then returns the encoded content to the browser 206.

Two popular design patterns are dominating today's WAP implementations: WAP Gateway/Proxy and WAP Server. Both are characterized by centralized software processing of WAP content. While this kind of software based implementation, crossing all general platforms such as NT and Unix, is a straight forward and intuitive approach adapted to the infancy stage of an industry standard such as WAP, it introduces many pitfalls and inefficiencies.

For example, most wireless gateways are pre-configured to handle only one type of cellular infrastructure or standard such as CDPD, Bell South Wireless Data (RAM), GSM, CDMA, TDMA, AMPS, D-AMPS, Ardis, FLEX/ReFLEX, Mobitex, DataTec, etc. and one type of wireless application protocol such as HTTP, WAP, HDML, cHTML, Web clipping. Accordingly, a carrier or service provider with a large customer base is forced to deploy multiple gateways with specific functionality to support the customers' infrastructure or protocol. Moreover, as new applications are developed such as TSL/WTSL and other security applications, the gateway must be replaced. Alternatively, if such new functionalities are added to the server, the processing power and server resources that they consume can cause the performance of the gateway to decrease.

Further, such standard or protocol-specific gateways are dedicated servers that are not fault-tolerant or load-balanced because it is generally not feasible or simple to provide multiple gateways and link them together with fault tolerance or load balancing functionalities.

As set forth above, the gateway is responsible for maintaining and managing connections with wireless devices in accordance with wireless protocols. FIG. 3 illustrates the WAP model for layering protocols in communications with wireless devices. It should be apparent that this model is similar to that of the ISO OSI Reference Model (ISO 7498) for upper layers. As shown in FIG. 3, on top of the underlying bearer service (e.g. GSM) are, respectively, a transport layer (e.g. WDP/UDP), a security layer (e.g. WTLS), a transaction layer (e.g. WTP), a session layer (e.g. WSP), and an application layer. The security layer and transaction layer may be considered as optional.

FIG. 4 illustrates a conventional gateway that can be used in the wireless model shown above. As shown in FIG. 4, in the conventional gateway 400, a network interface 402, a wireless data interface 404, a CPU 406, a program memory 408 and a data memory 410 communicate with each other via a bus 412.

In operation of the gateway illustrated in FIG. 4, data from the wired and wireless data networks are received at the network and wireless data interfaces, respectively, and buffered at the interfaces. At appropriate intervals, the CPU 406 is interrupted and causes the data in the interface buffers to be transferred to the data memory 410. The individual software tasks residing in the program memory 408 are selectively executed to operate on the data in the data memory so as to perform content conversion, protocol conversion, and session management, etc. Upon completion of the appropriate processing, the data is transferred back to the buffer of the appropriate interface and forwarded on the appropriate network.

The above conventional gateway implementation is very rudimentary and represents the least overall efficiency and the longest system latency, as will be explained in more detail below.

First, general purpose servers are typically used to implement the gateway 400 shown in FIG. 4. Such general purposed servers are loaded with heavy-weighted operating systems, which are not optimized for WAP related processes. Further, general purpose servers are bundled with other features such as supporting a keyboard, CD ROM, video and audio cards and other non-network related peripherals, which burden the CPU with much system overhead. A light-weighted embedded real-time operating system is desired.

Another drawback is that these servers are equipped with basic network adapters for implementing the network and wireless data interfaces 402 and 404. Such adapters rely completely on the host CPU to process the packets, and thus the host CPU exclusively handles network traffic processing. These kinds of network adapters place a heavy load on the host CPU in at least two ways. First, the adapter interrupts the host upon receipt of network data, and this interrupt causes two context switching operations on the host, a costly function in terms of CPU utilization. Second, data received by the adapter has to be processed layer through layer by respective engines 418 executing in a general operating system (e.g. NT or Solaris) residing in the host environment. Similarly, outgoing data must be packaged layer through layer by these non-optimized engines 418 before the adapter transmits it. Depending on the implementation, this layering processing may be very CPU intensive, and further, totally unnecessary given the purpose of WAP Gateway.

The lack of intelligence on these network adapters often results in multiple interrupts being issued for host notification, and each packet being copied and processed multiple times. The ideal design should be the one that moves the data around as less as possible. Finally, many designs are thread or process based. Every wireless user request will invoke an independent thread to handle it. The problem with this approach is that every thread has a structure created by the OS and its processing totally relies on the scheduling of the OS, i.e. the sequence of handling the requests. Under the newly deployed packet based wireless data network, thousands or more users can be online simultaneously. A correspondingly large number of threads can be extremely resource hungry and can cause the host system to be unstable at best and to crash at worst. This scenario has actually happened in I-Mode service because of the packet-based feature of the service networks and the large user base.

The conventional gateway illustrated in FIG. 4 suffers from even further drawbacks. For example, in operation as explained above, incoming data (e.g. WML text, perhaps in response to a request from a wireless user via a URL) from the wired network (e.g. the Internet) is buffered at the network interface. When a complete packet has been received, the network interface interrupts the CPU, which causes the packet to be transferred to the data memory via the bus. Then the CPU executes an encoder program 414 in the program memory to encode the data into binary format suitable for the wireless data network. The encoder program works on the data from the data memory, stores the encoded data back into the data memory, and interrupts the CPU, which then causes the encoded data to be sent to the wireless data interface, where it is buffered then sent out to the appropriate wireless destination. Similarly, incoming encoded data is buffered at the wireless data interface, transferred to the data memory, decoded by decoder program 416 and stored back into the data memory, then transferred back to the network interface for transmission to the appropriate network destination.

It should be apparent that the conventional gateway requires much CPU intervention and excessive transfer of data between elements and functions. Moreover, the scalability limitation of this design under heavy traffic and processing loads render this architecture suitable for sites with only low traffic expectation and simple traffic management requirements.

Not only is the design of FIG. 4 currently unsatisfactory for many purposes as illustrated above, it will grow more unsatisfactory in the future. For example, the pending WAP 2.0 specification, with the support of graphics and multimedia and the commercial deployment of packet based wireless data network such as GPRS, will dramatically accelerate the development of wireless Internet applications with even further complexity and dynamics. While the wireless Internet represents new ventures for application developers and complementary experiences to the end users, the fundamental network and traffic management requirements from the service providers' viewpoint are the same as that of the existing wired internet: reliability, scalability, easy management and cost effective. The current wireless gateway architecture does not adequately address these requirements.

SUMMARY OF THE INVENTION

The present invention relates to a gateway design for processing of wireless data content such as WML. In accordance with one aspect of the invention, a wireless gateway includes a chassis with an interconnecting backplane for allowing the addition and removal of different modules as they are needed. Each system module (e.g. WAP accelerator, SMS module, Page module, Mobile IP module, TSL/WTSL Accelerator, Multimedia Accelerator) is a fully working product that supports one particular function. A common bearer module supports all wired network interfaces such as Ethernet, ATM, Frame Relay, ISDN and more, as well as all wireless protocols including GSM, GPRS, SMS, Paging and more. A common database stores user and system information. A central manager manages all system modules, communications among them, and regular health check-ups. According to another aspect of the invention, an embedded design for hardware processing of traffic between wireless hosts and origin servers includes a host-optimized adapter, a seamlessly integrated embedded operating system and several CPUs handling different WAP stack layer processing. Engines for processing requests corresponding to the different WAP stack layers are totally separated, and may each run on a respective individual CPU. All engines and control blocks can exchange request-related information through a common request queue. Each request is uniquely identified by an assigned request structure. All user data are stored and processed in the data memory block. According to a further aspect of the invention, a wireless gateway includes a dedicated WAP engine that offloads the WML encoding and decoding functions from the CPU. Incoming unencoded data from a wired network is buffered at the WAP engine and converted into binary form for transmission in the wireless data network via a wireless data interface. Incoming encoded data from the wireless data network is buffered at the WAP engine and converted into textual form for transmission in the wired network via the network interface.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
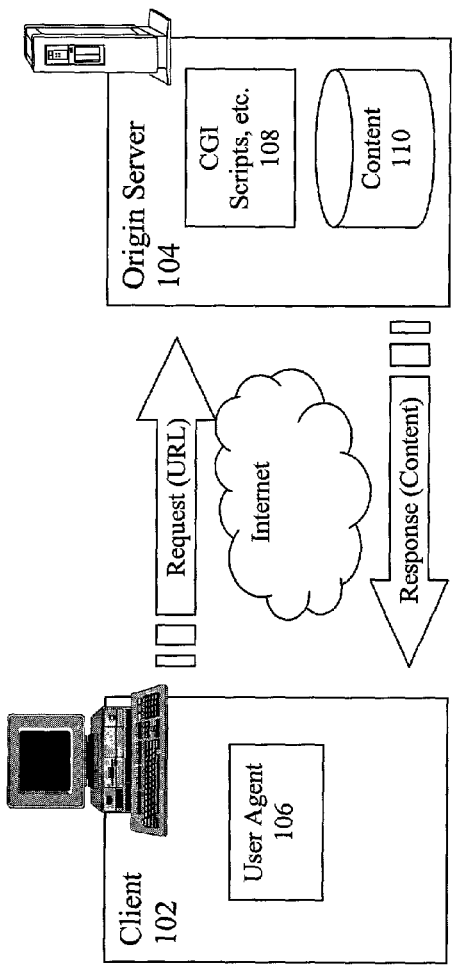
FIG. 1 illustrates the WWW model for providing requested content from an origin server to a client.
Figure 2:
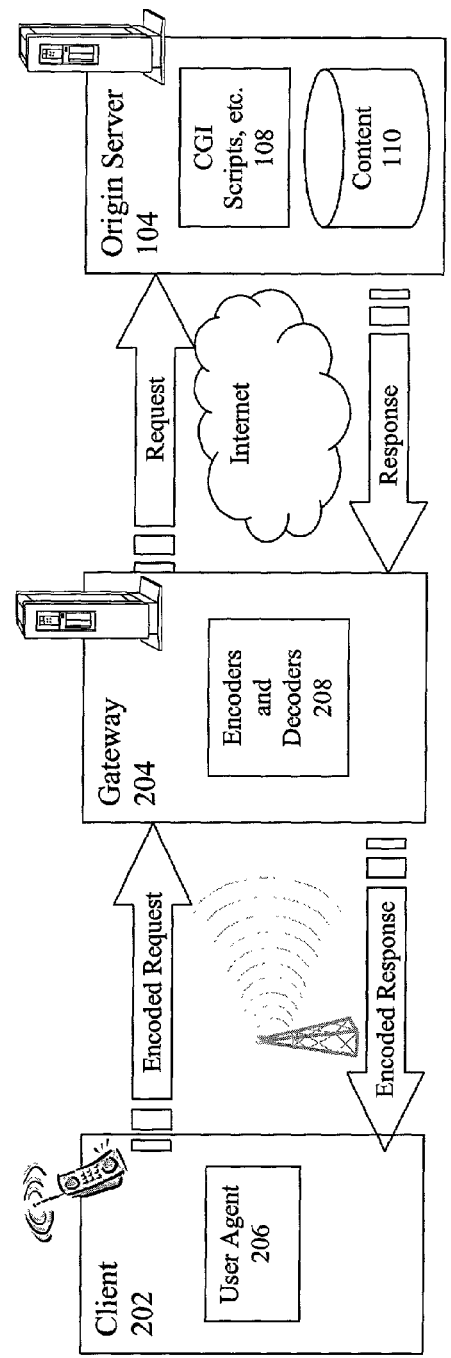
FIG. 2 illustrates the WAP model for providing requested content from an origin server to a wireless client via a gateway.
Figure 3:
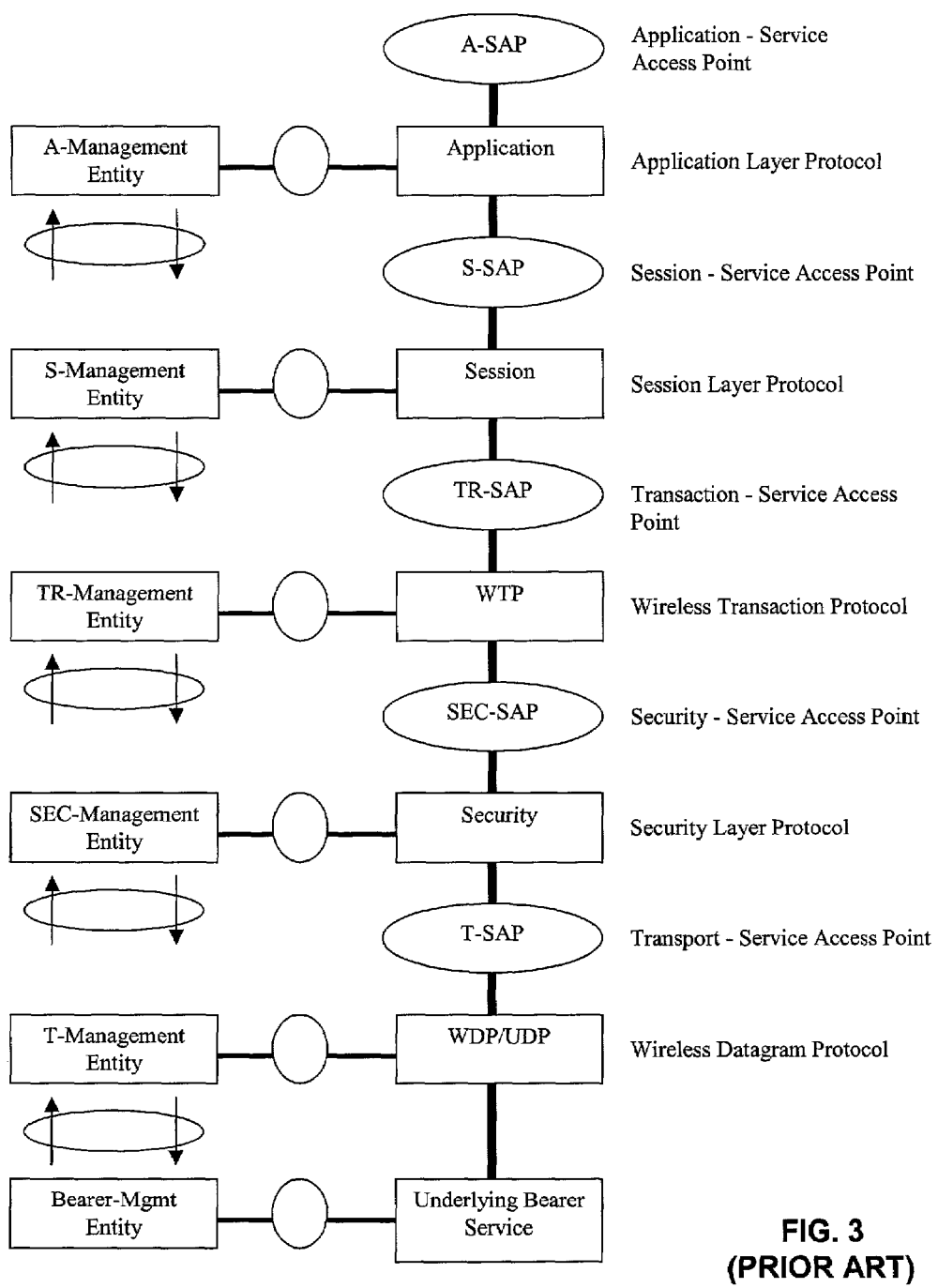
FIG. 3 illustrates the reference model of layering protocols in accordance with WAP.
Figure 4:
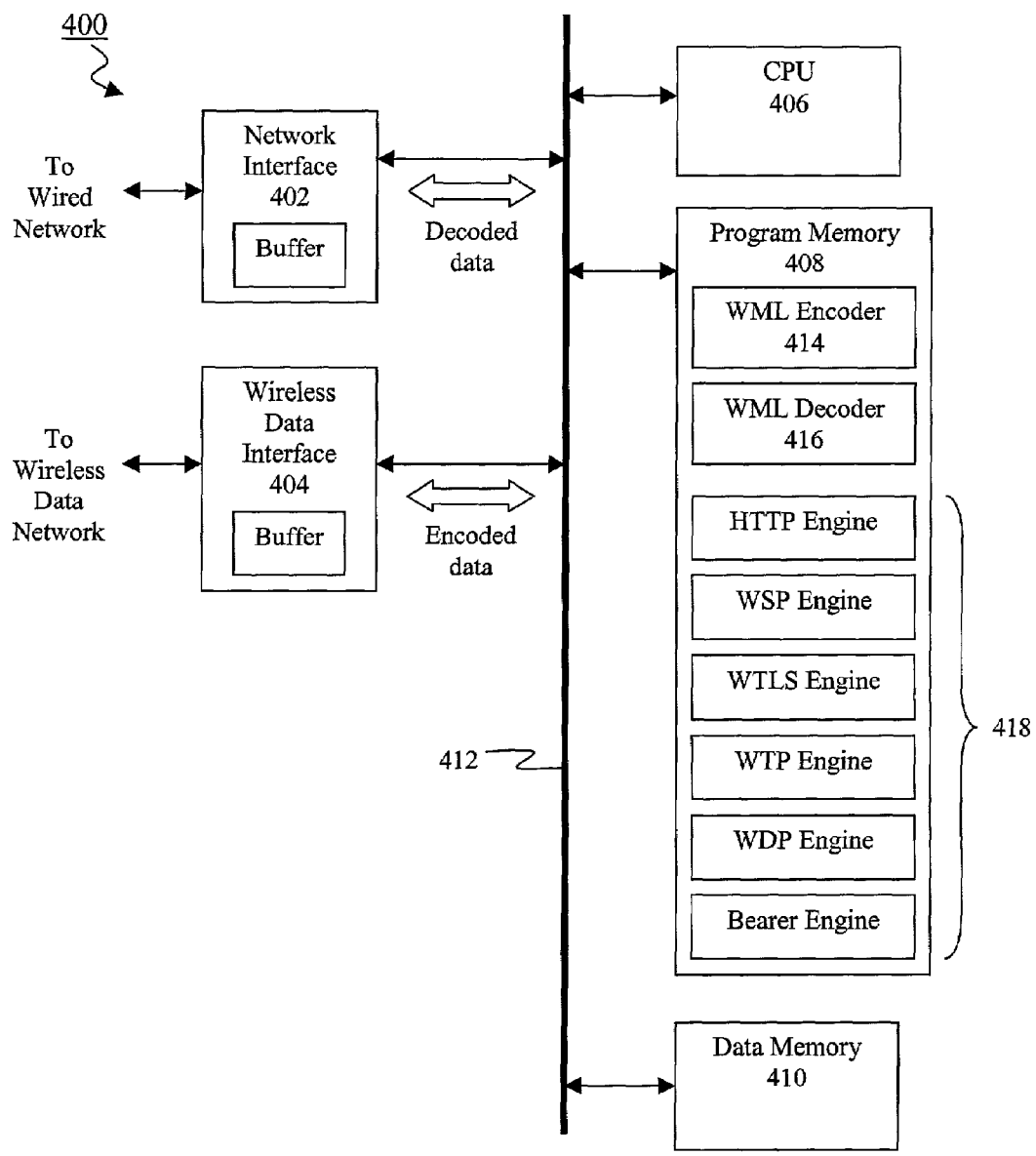
FIG. 4 illustrates a conventional gateway in accordance with the WAP model.
Figure 5:
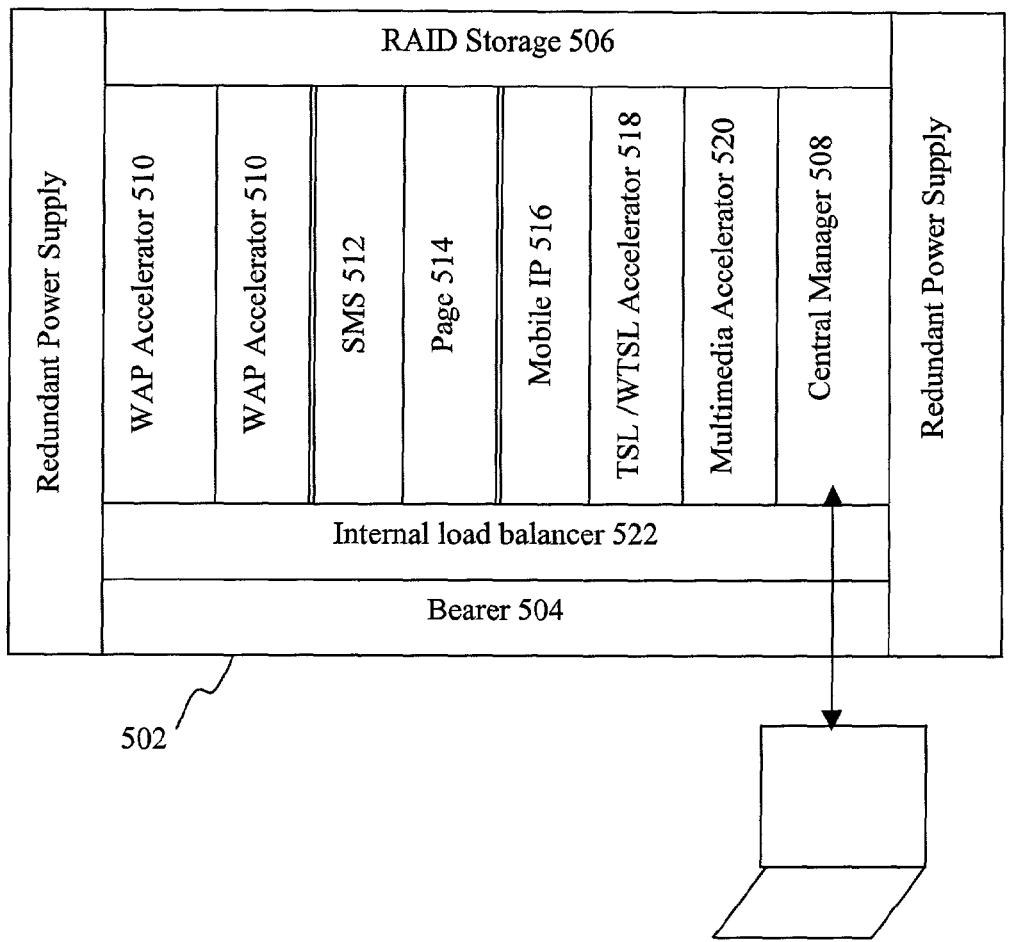
FIG. 5 is a structural diagram illustrating a gateway architecture in accordance with an aspect of the invention.

FIG. 5 is a structural block diagram illustrating an example of a multiprotocol wireless gateway in accordance with the present invention. As can be seen, the wireless gateway in accordance with the invention integrates support for SMS, WAP, HTTP and mobile IP protocols. The overall architecture is implemented as a fully chassis based stackable switch system. That is, the gateway is implemented as a chassis 502 with an interconnecting backplane (not shown) for allowing the addition and removal of different modules as they are needed.

This distributed system design is ideal for customers with a large user base, spread across multiple underlying network infrastructures and needing various services. A common bearer module 504 supports all wired network interfaces such as Ethernet, ATM, Frame Relay, ISDN and more, as well as all wireless protocols including GSM, GPRS, SMS, Paging and more. A common database implemented, for example, using RAID storage 506 stores the user and system information. The central manager 508 provides the ability for a system manager to manage all the system modules, communications among them, and regular health check-ups via an external terminal, for example. In one example of the invention, the chassis supports the incorporation of up to ten modules. The modules may support the same or different functionalities. For example, for fault tolerance, load balancing or improved performance, two or more modules supporting the same protocol or service may be provided. The addition and removal of modules may be dynamically performed based on the environment and customer's requirements. This chassis based, stackable system is load-balanced using load balancer 522, fault-tolerant, flexible, scalable, reliable and easily manageable.

In accordance with the invention, each system module (i.e. WAP accelerator 510, SMS module 512, Page module 514, Mobile IP module 516, TSL/WTSL Accelerator 518, Multimedia Accelerator 520 in the example shown in FIG. 5) is a fully working product that supports one particular function. The idea is to make sure that the system can be extended to support future technologies and functionalities.

The WAP Acclerator module 510 can be a card such as that as will be described in more detail below. Those skilled in the art will be able to understand how to implement the functionality of other modules in addition to and including those mentioned above after being taught by the examples set forth herein.

One example of a module that supports extended functionality is the TSL/WTSL Accelerator module 518.

TSL and WTSL are the de facto means of secure communications for Web-based and WAP-based applications. However, the realization consumes an inordinate amount of CPU capacity, since it relies on heavy mathematics with large prime numbers, something for which today general-purpose processors are poorly suited.

The TSL/WTSL Accelerator 518 adds hardware-assisted cryptographic co-processing capability. The most obvious benefit of co-processing is performance improvement. By using special-purpose processing hardware and software, the gateway overall can experience a dramatic increase in the number of WTSL and TSL connections it can handle, and each connection will complete in less time.

Equally important, once the switch has decrypted the query, all content information including cookies, URLs, and other header information will be visible to other modules in the gateway. Further, the modules can apply defined rules to the decrypted traffic in order to select an optimal server, support personalization services such as cookie-based QoS and persistence, as well as browser-based traffic redirection, and so on.

Another benefit of having WTSL and TSL processing on a dedicated device that is not accessible to users or system administrators is that sensitive information such as root keys and certificates are far less likely to be compromised.

Another example of the functionality that can be incorporated in the gateway in accordance with the invention is support for truly personalized and intelligent switching of wireless connections. Two kinds of personalization can be included in the gateway: explicit personalization and implicit personalization.

Explicit personalization is based on information that the system has statically captured from the user. This includes profiling, registration information, specified user interface customization, and push/publication requests.

Implicit personalization is more critical for the wireless Internet applications, as it symbolizes the dynamic character of m-commerce. To realize a true anywhere, anytime, anyone and anything mobile Internet, the gateway captures momentary system requirements under particular user requests at that moment, and allocates the necessary system resources such as bandwidth, priority of the queue, destined application server, etc. based on the consideration of overall weighted factors. For instance, HTTP and WAP headers contain specific information that can indicate browser-type, browser version, resolution, plug-in capabilities, OS, language, time zone and more. Another possibility is that, with the deployment of packet switched wireless data network, more users will be staying on line in idle mode, and dynamically generate various requests for different applications. Under this vibrant circumstance, the wireless gateway of the invention handles all the requests in a scalable and reliable fashion.

Figure 6:
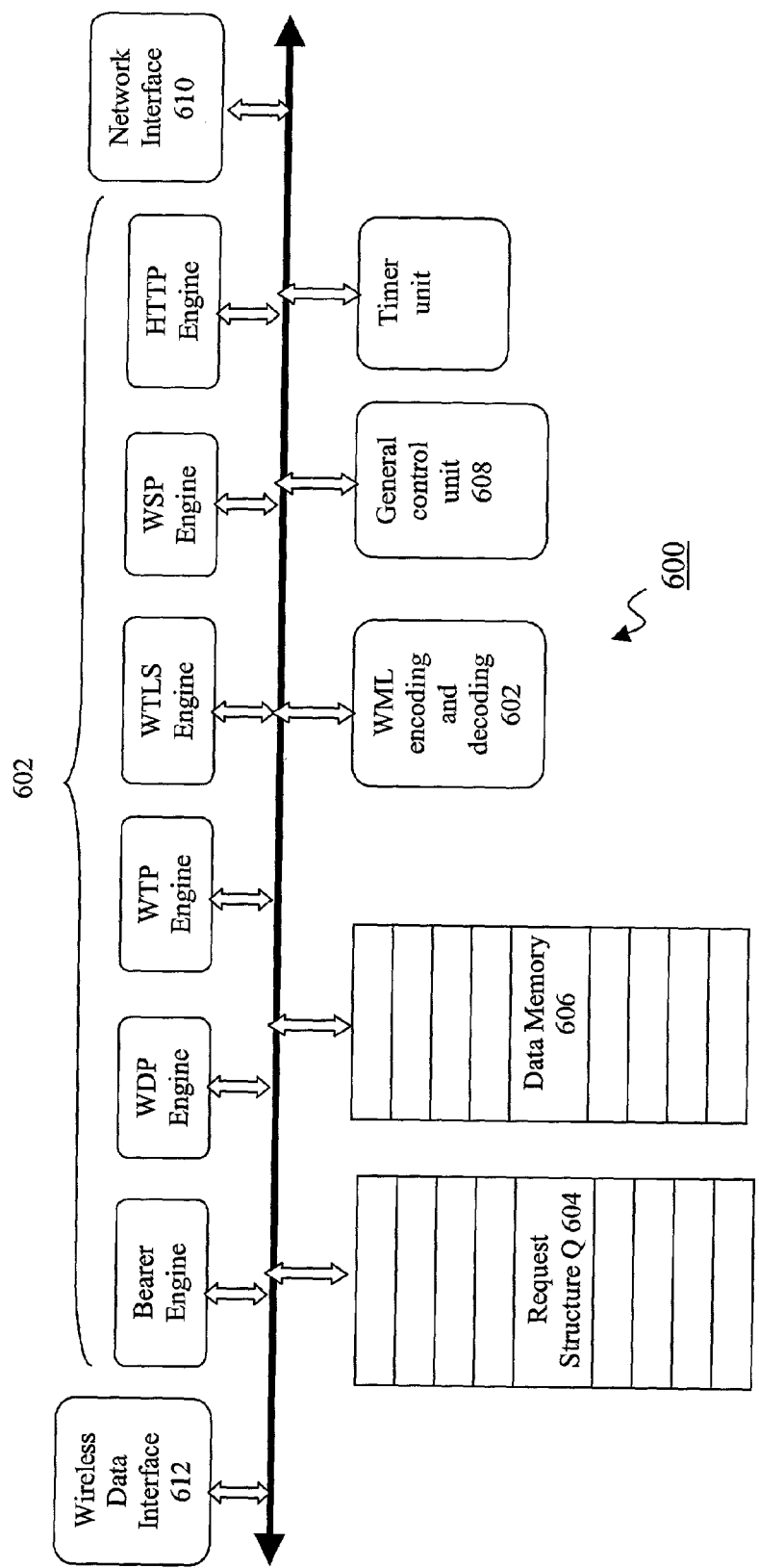
FIG. 6 is a schematic diagram illustrating an example of a gateway architecture in accordance another aspect of the present invention.

FIG. 6 is a schematic block diagram illustrating an example architecture of a gateway 600 in accordance with another aspect of the present invention.

As shown in FIG. 6, the present invention uses an embedded system design philosophy and includes a host-optimized adapter, a seamlessly integrated embedded operating system and several CPUs handling different WAP stack layer processing in contrast to the prior art. The number and types of engines 602 and associated WAP stack layers are shown by way of example, only, and those skilled in the art will be able to understand implementations with more or fewer engines after being taught by the present example.

Referring again to FIG. 6, engines 602 for processing the WAP stack layers are totally separated, and may each run on an individual CPU. Two or more less CPU power-greedy WAP stack layers may, however, be combined to run on the same CPU. In any event, each engine remains independent. All engines and control blocks exchange request-related information through the common request queue 604. Each request is uniquely identified by an assigned request structure. All user data are stored and processed in the data memory block 606.

In operation, the general control unit 608 causes data received from the network and wireless data interfaces 610, 612 respectively, to be transferred into the data memory and sets up a corresponding request structure in the request structure queue. Generally, every engine runs independently and periodically checks the request queue. Once it finds that there is a pending request in the queue, each engine will take care of the related task sequentially by reading and setting the corresponding fields in the request structure.

The overall architecture as shown in FIG. 6 is scalable, robust and efficient. Not all requests will go through all stack layers, and some layer processing requires more CPU power, such as WTLS. Engines associated with layer processing that require CPU intensive calculations can be implemented to run on a powerful CPU. More requests can be handled and will be simply passed to the next layer through the all-accessible request table.

Data movement is minimized. Both structures and payloads are manipulated in the memory. The designated engines may further include functionality for processing repetitive tasks like WML encoding and decoding, removing and adding packet headers, checksum computation, and byte swapping. These activities are more efficiently handled in hardware than host software. Coupled with the fully hardware-aware operating system, moving data in the memory can be simply realized through pointer changes, and thus eliminates all unnecessary data copy operations, which are CPU-intensive.

Client transaction sessions are not "active" at all times and thus requests, such as HTTP for example, are not being constantly generated. In the event that the system exceeds the capacity of one engine, or comes under the surge of sudden concurrent active requests, the client connection will not necessarily always be rejected, as the system actually will handle them by updating the necessary structure fields, and effectively queue them for later processing. This design guarantees the scalability and reliability of the system.

This true embedded system design with enriched hardware capabilities and streaming down but seamlessly integrated software features essentially achieve peak performance. The overall system achieves efficiency, reliability and scalability, which features are particularly important for the future WAP development, both in terms of equipment costs and business productivity.

Figure 7:
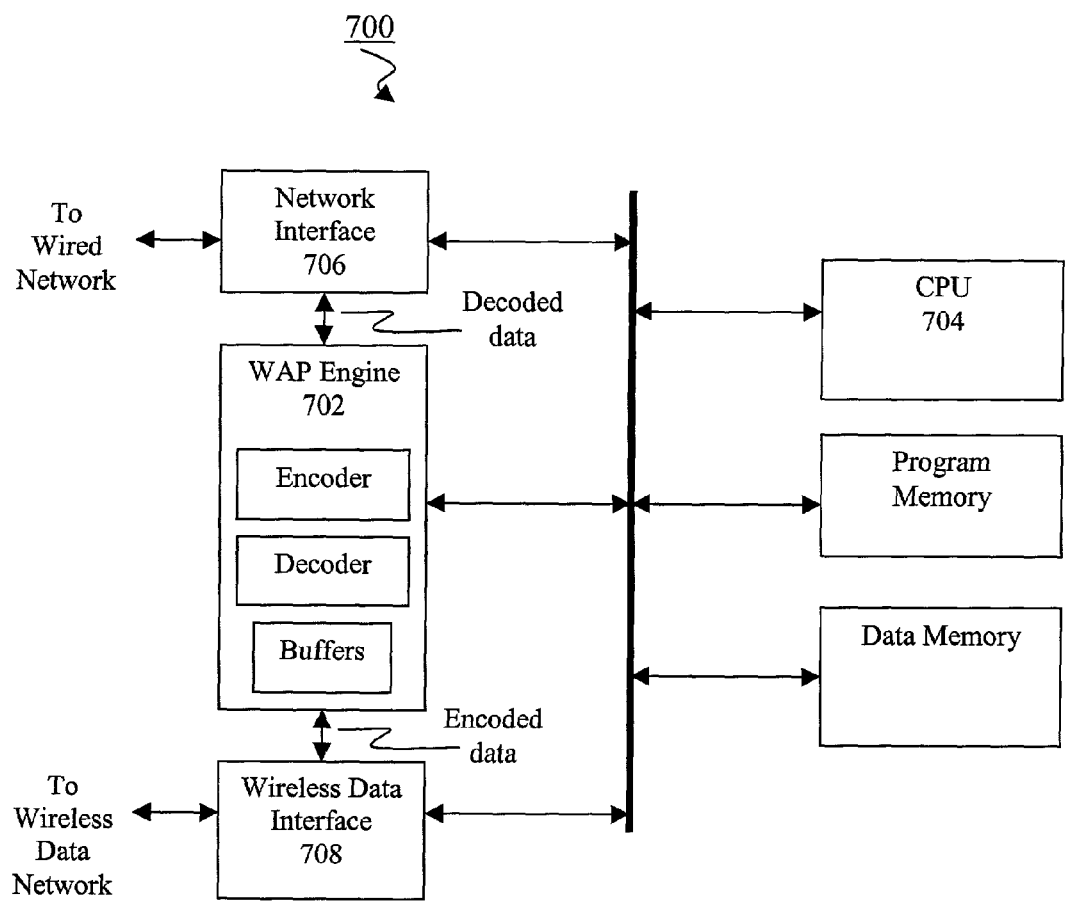
FIG. 7 is a schematic block diagram illustrating an example of a gateway in accordance with another aspect of the present invention.

FIG. 7 is a schematic block diagram illustrating an example of a gateway 700 in accordance with even further aspects of the invention. In contrast to the conventional gateway, it can be seen that the gateway of the present invention includes a WAP engine 702 that incorporates an encoder and decoder, along with buffers for storing encoded and decoded data for transferring between wired and wireless hosts. Accordingly, the present invention frees the CPU 704 and the gateway as a whole from repetitive and inefficient tasks, as well as from needless and repetitive transfer of data between different components of the gateway.

In operation, the network interface 706 communicates with a wired network to exchange unencoded content with a host such as a web server. The network interface may include functionality for maintaining Ethernet, ATM, Frame Reply, T1, E1, etc. connections to the external network. The wireless data interface 708 communicates with a wireless data network to exchange encoded content with a host such as a wireless device. Incoming unencoded and encoded content received at the interfaces is transferred directly to the WAP engine 702, and outgoing unencoded and encoded content is transferred directly to the interfaces, either automatically or under the control of the CPU 704.

The network interface and wireless data interface may further communicate with the CPU 704 so it can perform protocol conversion, session management, etc. It should be noted that, although shown separately for clarity of the invention, the network interface and wireless data interface may be implemented in one element together with the WAP engine.

Generally, the WAP engine encodes incoming WML content into a compact binary form before it is forwarded to the wireless device so as to save scarce wireless bandwidth. This process is known as tokenization. The structure and content of the WML documents are encoded into standard binary values that have been precisely defined in the WAP specification. The WML element tags, attributes, variable references and other common strings, such as "http://," for example, are directly transformed into corresponding octet representations. In the conventional gateway, this process is still mainly implemented in software. However, such one-to-one mapping is more suitably implemented with in hardware. Given the concern that the WAP is still under development, the WAP engine may be initially implemented in FPGA or may be implemented as microcode with a CPU.

The following is a WML encoding example in accordance with the WAP WML specification that will be used to illustrate the encoding features of the present invention. For example, consider the following WML source code received by the WAP engine:

```
<wml>
<card id="abc" ordered="true">
<p>
<do type="accept">
<go href="http://xyz.org/s"/>
</do>
X: $(X)<br/>
Y: $(Y)<br/>
Enter name: <input type="text" name="N"/>
</p>
</card>
</wml>
```

The encoder functionality of the WAP engine will convert this textual document into a binary data stream in accordance with the mapping table. The following numbers are in hexadecimal.

02 08 6A 04 'X' 00'Y' 00 7F E7 55 03 'a' 'b' 'c' 00 33 01 60 E8 38 01 AB 4B 03 'x' 'y' 'z' 00 88 03 's'00 01 01 03 ' ' 'X'':' ' ' 00 82 00 26 03 ' ' 'Y' ':' ' ' 00 82 02 26 03 ' ' 'E''n''t''e''r' ' ' 'n' 'a''m''e'':' ' ' 00 AF 48 21 03 'N'00 01 01 01 01.

The following table explains the values in the binary data stream.

| Token Stream | Description |
| --- | --- |
| 02 | WBXML Version number 1.2 |
| 08 | WML 1.2 Public ID |
| 6A | Charset = UTF-8 (MIBEnum 106) |
| 04 | String table length |
| 'X', 00, 'Y', 00 | String table |
| 7F | wml, with content |
| E7 | Card, with content and attributes |
| 55 | id= |
| 03 | Inline string follows |
| (skipped) | |
| 03 | Inline string follows |
| 'N', 00 | String |
| 01 | END (of input attribute list) |
| 01 | END (of p element) |
| 01 | END (of card element) |
| 01 | END (of wml element) |

It should be apparent that, if the above conversion is realized in software, it means the process has to check and render byte by byte. This is a slow and CPU-intensive action. The WAP engine of the present invention relieves the CPU of this required processing.

Figure 8:
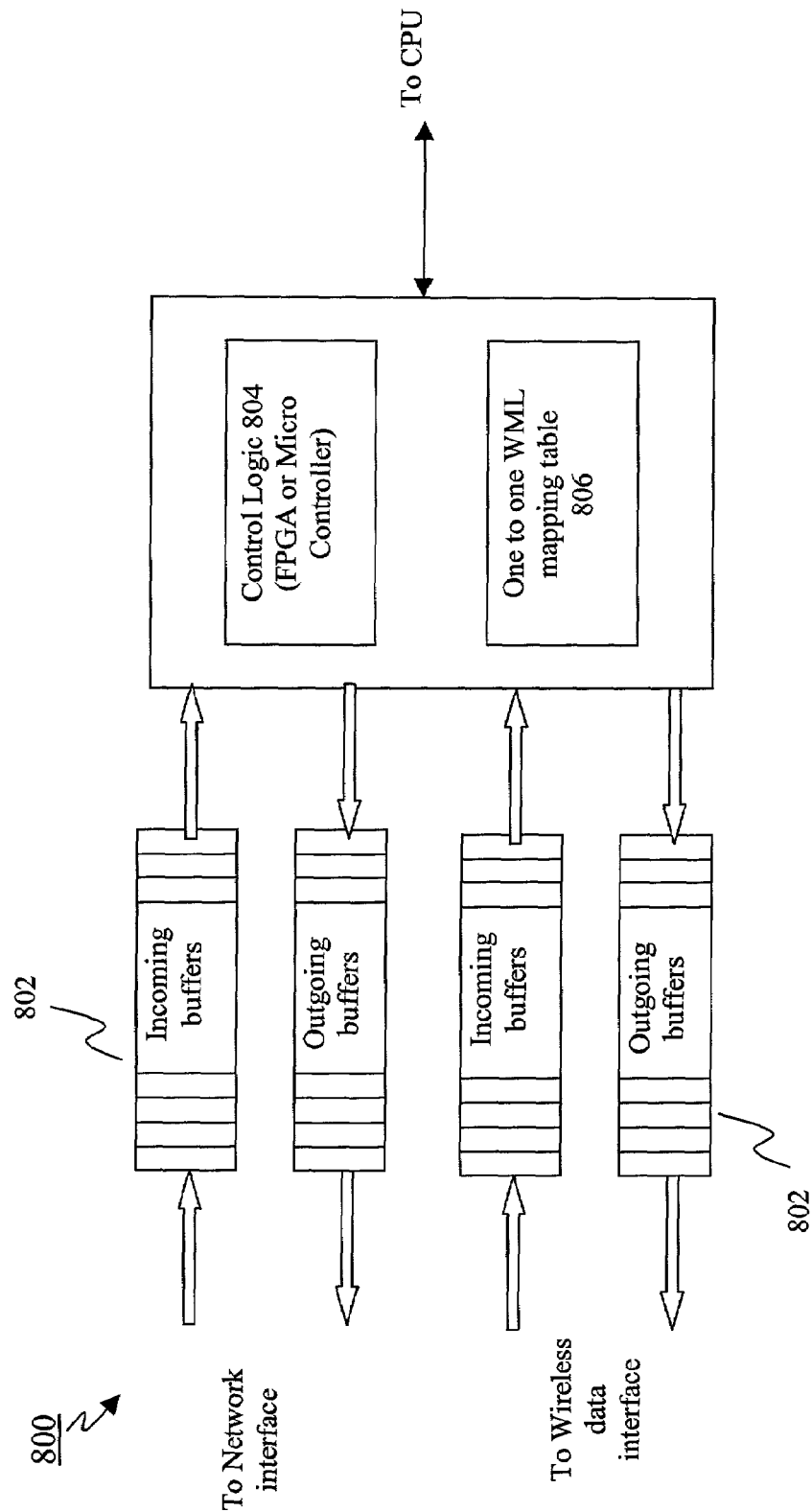
FIG. 8 illustrates an example of a WAP engine that can be incorporated in the gateway illustrated in FIG. 7 in accordance with an embodiment of the present invention.

FIG. 8 illustrates an example of a WAP engine 800 that can be used to implement engine 702 in FIG. 7 in even more detail. As shown in FIG. 8, the WAP engine 800 includes buffers 802 for storing incoming and outgoing decoded and encoded content both from and to wired and wireless hosts. Control logic 804 controls the operation of the encoding and decoding operations in accordance with the incoming and outgoing data and the one-to-one WML mapping table, and communicates with the CPU as necessary for handshaking, etc.

The mapping table 806 stores the one to one mapping tokens and corresponding ASCII values for WML.

The control logic 804 keeps checking for any new data in each incoming buffer, and realizes the encoding or decoding by looking up the indexed mapping table and writing the mapped values into the outgoing buffer accordingly. The hardware implementation is essentially a network controller with WAP intelligence. The design is cost effective with high performance. The control logic may further communicate with the CPU as necessary for handshaking, etc.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A wireless gateway architecture, comprising:
   a chassis having a common backplane;
   a common bearer interface coupled to the backplane for communicating with wired and wireless networks using a plurality of communication standards; and
   a plurality of system modules coupled to the backplane, at least two of the system modules providing support for two different wireless application protocols.

2. An architecture according to claim 1, wherein the plurality of system modules are comprised of a respective plurality of cards.

3. An architecture according to claim 1, further comprising:
   a load balancer for balancing processing among two or more of the plurality of system modules that provide support for the same wireless application protocol.

4. An architecture according to claim 1, wherein at least one of the system modules includes a TSL/WTSL accelerator.

5. An architecture according to claim 1, further comprising storage for storing personalization information useful for intelligent switching of wireless connections.

6. An architecture according to claim 5, wherein the personalization information is explicitly provided by a user.

7. An architecture according to claim 5, wherein the personalization information is implicitly provided in wireless data.

8. A wireless gateway, comprising:
   a CPU that manages the wireless gateway; and
   a plurality of stack layer engines separate from the CPU, each of the plurality of stack layer engines respectively processing requests associated with a different Wireless Application Protocol (WAP) layer.

9. A wireless gateway according to claim 8, further comprising:
   a data memory that stores data associated with wireless user requests and is accessible to the plurality of stack layer engines; and
   a request structure queue that stores control information associated with the wireless user requests,
   the stack layer engines periodically polling the request structure and operating on data in the data memory in accordance with the control information in the request structure.

10. A wireless gateway, comprising:
- a CPU that manages sessions between a network host and a wireless host; and
- a WAP engine separate from the CPU that encodes content from the network host destined for the wireless host and decodes content from the wireless host destined for the network host.

11. A wireless gateway according to claim 10, further comprising:
- a program memory that stores instructions for execution by the CPU; and
- a data memory that stores data for operation by the instructions,
- the WAP engine being further separate from the program memory and the data memory.

12. A wireless gateway according to claim 10, wherein the WAP engine includes:
- first buffers for storing textual content associated with the network host;
- second buffers for storing binary content associated with the wireless host;
- a WML mapping table that provides a mapping between the textual content and the binary content; and
- control logic coupled to the first and second buffers and the WML mapping table, the control logic controlling the encoding and decoding in accordance with the mapping in the WML mapping table.

* * * * *